Figure 2:
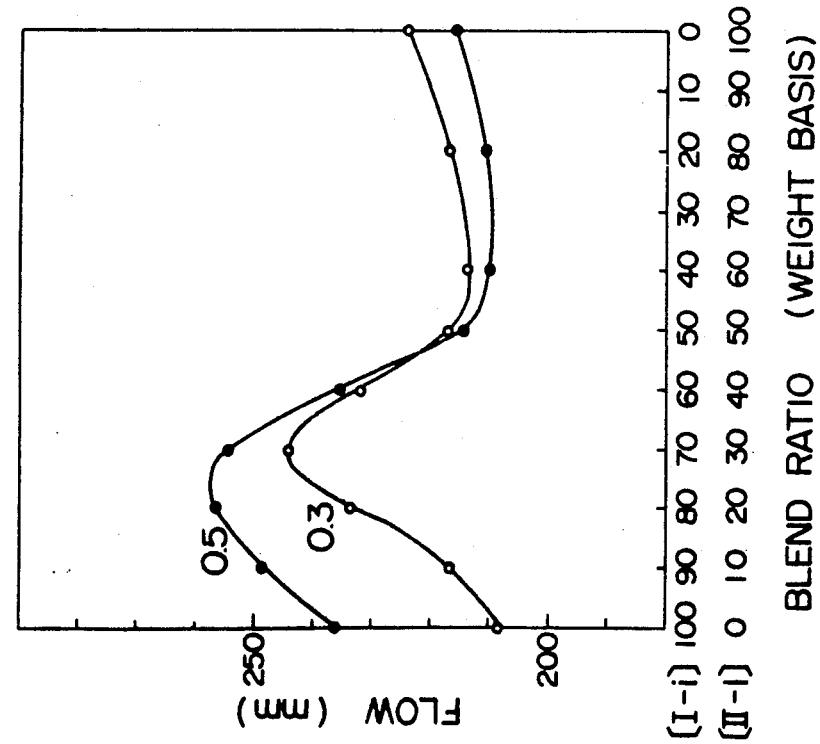

United States Patent [19]
Natsuume

[11] 4,125,410
[45] Nov. 14, 1978

[54] WATER-REDUCING ADMIXTURE

[75] Inventor: Tadao Natsuume, Yokosuka, Japan

[73] Assignee: Nippon Zeon Co., Ltd., Tokyo, Japan

[21] Appl. No.: 717,380

[22] Filed: Aug. 24, 1976

[30] Foreign Application Priority Data

Aug. 27, 1975 [JP] Japan .................................. 50-103843
Sep. 25, 1975 [JP] Japan .................................. 50-115842

[51] Int. Cl.$^2$ ............................................. C04B 13/20
[52] U.S. Cl. ........................................ 106/90; 106/314;
260/39 R; 260/29.3; 260/29.4 R; 260/38;
260/823; 528/265; 528/158
[58] Field of Search ........................ 106/314, 90, 111;
260/38, 39, 29.3, 29.4, 57 R, 67.6 R

[56] References Cited
U.S. PATENT DOCUMENTS

| | | | |
|---|---|---|---|
| 2,478,831 | 8/1949 | MacPherson | 106/90 |
| 2,790,724 | 4/1957 | Bergman | 106/90 |
| 3,390,109 | 6/1968 | Reverdin et al. | 106/90 |
| 3,817,767 | 6/1974 | Bozer et al. | 106/90 |
| 3,936,310 | 2/1976 | Natsuume | 106/111 |

Primary Examiner—Winston A. Douglas
Assistant Examiner—J. V. Howard
Attorney, Agent, or Firm—Sherman & Shalloway

[57] ABSTRACT

A water-reducing admixture for use in preparing a hydraulic composition comprising
I. 95 to 50% by weight of a water-soluble sulfonate and
II. 5 to 50% by weight of a water-soluble copolymer, said water-soluble sulfonate (I) being selected from the group consisting of
a. a water-soluble salt of a sulfonated aromatic hydrocarbon,
b. a water-soluble sulfonate, and
c. a water-soluble salt of sulfonated melamine resins.

11 Claims, 4 Drawing Figures

WATER-REDUCING ADMIXTURE

This invention relates to a new water-reducing admixture having excellent properties for use in preparing hydraulic cement.

In preparing mortar or concrete various admixtures for hydraulic cement such as air-entraining agents, water-reducing agents, retarders, accelerators, waterproofing agents and expansion agents are used in accordance with the intended use of the mortar or concrete. Of these admixtures, the water-reducing agent is one of the most frequently used admixtures. The following effects are brought about by its use.

1. The workability of the not yet set mortar or concrete is enhanced (the unit amount of water to be added to the cement can be reduced for obtaining the same consistency).
2. As it is possible to reduce the amount of water used, the strength of the resulting hardened mortar or concrete can be increased (the amount of cement used can be reduced for obtaining a structure of the same strength).
3. The watertightness can be enhanced.

As water-reducing admixtures, known heretofore are the lignosulfonic acids and their salts, the alkylarylsulfonic acids and their salts, the naphthalenesulfonic acid-formaldehyde condensation products and their salts, and the hydroxycarboxylic acids and their salts. Of these, the water-soluble sulfonates of aromatic hydrocarbons and the water-soluble sulfonates containing, as a structural unit, a condensation product of a sulfonated aromatic hydrocarbon with an aliphatic aldehyde are especially typical (U.S. Pat. Nos. 2,141,569 and 2,690,975). On the other hand, as a water-reducing admixture whose performance as a water-reducing agent is not too good and moreover whose cost is high but whose property of retarding the setting is small and whose property of entraining air is also small, there is known the water-soluble salt of a sulfonated melamine resin (Japanese Patent Publication No. 21659/68 and Japanese Laid-Open Patent Application No. 63015/75).

The object of the present invention is to provide a water-reducing admixture of still greater water-reducing effect.

I found that by conjointly using in a specific proportion either a water-soluble sulfonate of an aromatic hydrocarbon, a water-soluble sulfonate containing, as a structural unit, a condensation product of a sulfonated aromatic hydrocarbon with an aliphatic aldehyde, or a water-soluble salt of a sulfonated melamine resin along with a water-soluble copolymer of an olefin with an ethylenically unsaturated dicarboxylic acid the effects as a water-reducing admixture could be greatly enhanced as a result of synergism.

Accordingly, there is provided in accordance with the present invention a water-reducing admixture comprising as its effective component a mixture consisting of (I) 95 to 50% by weight of a water-soluble sulfonate selected from (a) a water-soluble salt of a sulfonated aromatic hydrocarbon, (b) a water-soluble sulfonate containing, as a structural unit, a condensation product of a sulfonated aromatic hydrocarbon with an aliphatic aldehyde and (c) a water-soluble salt of a sulfonated melamine resin and (II) 5 to 50% by weight of a water-soluble olefin-ethylenically unsaturated dicarboxylic acid salt copolymer.

If the water-reducing admixture of this invention is more fully described, as the foregoing water-soluble sulfonate (I) thereof, there is used either a. a water-soluble salt of a sulfonated aromatic hydrocarbon represented by the following structure

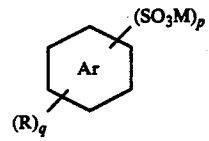

wherein

is an aromatic ring selected from the group consisting of the benzene ring and a condensed ring having 2–12 rings, M is selected from the group consisting of an alkali metal atom, an alkaline earth metal atom, ammonium ion and a lower amine such as methyl-, ethyl- or butylamine, R is selected from the group consisting of hydrogen atom, $-NH_2$, $-OH$, $-COOH$ and an alkyl group having 1-2 carbon atoms, $p$ is an integer from 1 to 2, and $q$ is an integer from 1 to 2;

b. a water-soluble sulfonate having a structural unit represented by the following formula

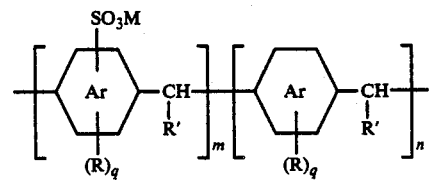

wherein

is an aromatic ring selected from the group consisting of the benzene ring and a condensed ring having 2–12 rings, M is selected from the group consisting of an alkali metal atom, an alkaline earth metal atom, ammonium ion and a lower amine such as methyl-, ethyl- or butylamine, R is selected from the group consisting of hydrogen atom, $-NH_2$, $-OH$, $-COOH$ and an alkyl group having 1-2 carbon atoms, R' is selected from the group consisting of hydrogen atom and an alkyl group having 1–4 carbon atoms, $q$ is an integer 1–2, $m$ and $n$ are each an integer, $m$ plus $n$ providing a molecular weight of 1500–10,000; or c. a water-soluble salt of a sulfonated melamine resin selected from the group consisting of 1 melamine-formaldehyde polycondensates and 2 melamine-phenol-formaldehyde polycondensates.

As the aromatic hydrocarbon, the starting material of the water-soluble sulfonates (I)-(a) and (I)-(b), i.e., the source of the

in the above formulas, typical examples include such hydrocarbons as benzene, naphthalene, fluorene, anthracene, phenanthrene, pyrene, naphthacene, pentacene, hexacene, coronene, acenaphthene, etc. However, also usable as the starting material in preparing the aforesaid water-soluble sulfonates (I)-(a) and (I)-(b) of this invention are the derivatives of these hydrocarbons, for example, those compounds having one or two substituents such as $-NH_2$, $-OH$, $-COOH$, an alkyl group having 1 or 2 carbon atoms, etc., or a material consisting of a mixture of the foregoing hydrocarbons and the foregoing hydrocarbon derivative, for example, creosote oil, petroleum cracking fractions having a high boiling point, etc.

The water-soluble sulfonate (b) containing a structural unit of the formula

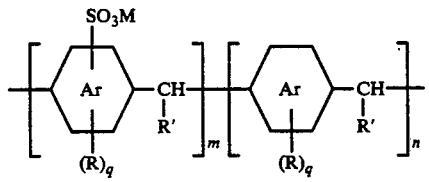

can be readily prepared either by condensing the aforesaid sulfonated aromatic hydrocarbon with an aliphatic aldehyde (e.g. formaldehyde) or by condensing a mixture of the foregoing aromatic hydrocarbon and the foregoing sulfonated aromatic hydrocarbon with an aliphatic aldehyde (e.g. formaldehyde). These methods of preparation are described in detail in, for example, Japanese Patent Publication Nos. 9443/60, 26249/65, 11737/66 and 39208/72, Japanese Laid-Open Patent Application No. 58120/75 and German Laid-Open Patent Application No. 2,261,659.

The foregoing water-soluble salt of a sulfonated melamine resin (c) can be readily prepared in customary manner by, say, the procedure described in Japanese Patent Publication No. 21659/68 or Japanese Laid-Open Patent Application No. 63015/75, i.e., by condensing 2–6 moles, preferably 2–3 mols, of formaldehyde with one mol of melamine and then sulfonating the condensation product or by condensing a mixture of melamine and phenol in a molar ratio of 0.4–0.95:0-.6–0.05, preferably 0.5–0.9:0.5–0.1, with 1–6 mols, preferably 2–5 mols, of formaldehyde per mol of said mixture and then sulfonating the resulting condensation product.

The water-soluble olefin-ethylenically unsaturated dicarboxylic acid salt copolymer (II) that is contained in the water-reducing admixture of this invention is particularly one containing a structural unit of the formula

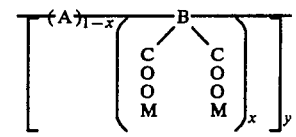

wherein
A is an olefin unit having 4–6 carbon atoms,
B is selected from the group consisting of

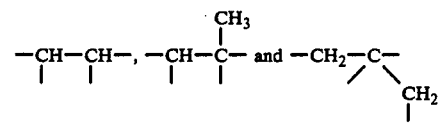

M is selected from the group consisting of an alkali metal atom, an alkaline earth metal atom, ammonium group and a lower amine such as methyl-, ethyl- or butylamine,
x is from 0.4 to 0.6, and
y is an integer from 2 to 300.

This copolymer can be obtained by a known procedure, for example, that described in Japanese Patent Publication No. 34181/74 or U.S. Pat. No. 3,691,107. For example, an olefin (A) and an ethylenically unsaturated dicarboxylic acid anhydride (e.g. maleic anhydride, citraconic anhydride or itaconic anhydride) are submitted to radical polymerization at 5°–150° C. using a solvent such as acetone, methyl ethyl ketone, benzene, toluene or ethyl acetate. The resulting copolymer is then submitted to a neutralization reaction with an aqueous solution containing either a hydroxide or carbonate of a metal such as sodium, potassium and magnesium or ammonium hydroxide at room temperature or with application of heat to obtain the intended copolymer. Alternately, a procedure consisting of submitting an olefin (A) and an ethylenically unsaturated dicarboxylic acid to radical polymerization and thereafter neutralizing the resulting copolymer with a base can also be employed.

The value of y in the above formula can be obtained from the average molecular weight MW as measured by a vapor pressure osmometer. As the $C_{4-6}$ olefins, there can be mentioned such compounds as butene-1, butene-2, isobutylene, pentene-1, pentene-2, 2-methylbutene-1, 2-methylbutene-2, 4-methylbutene-1, hexene-1 and the mixtures of these olefins. If a copolymer obtained by the use of an olefin other than the $C_{4-6}$ olefins is conjointly used with the aforementioned water-soluble sulfonate (I), the synergistic effects are not demonstrated at all. As the ethylenically unsaturated dicarboxylic acid salt unit

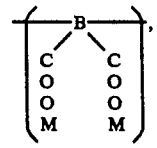

the maleates are preferred.

The water-soluble sulfonate component (I) and water-soluble copolymer component (II) are mixed in a weight ratio of 95–50%:5–50%, and preferably 90–60%:10–40%. The water-reducing admixture containing the components (I) and (II) in the above ratio is added at the time of mixing concrete, mortar or cement paste in an amount of 0.01–2.0% by weight, and preferably 0.2–0.7% by weight, based on the cement.

The invention water-reducing admixture is used in the form of either a dry powder or an aqueous solution. Further, it may also be added to the cement along with other additives, if necessary.

The present invention will now be described by reference to preparation experiments, examples and the accompanying drawings. Unless otherwise specified, the percentages and parts are on weight basis.

Figure 1:
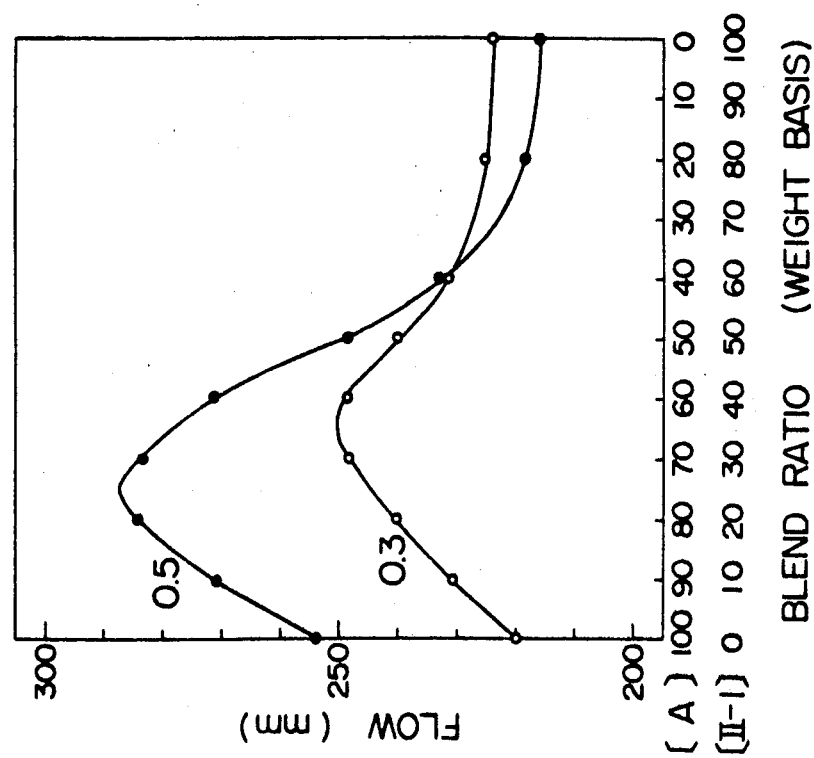
Figure 4:
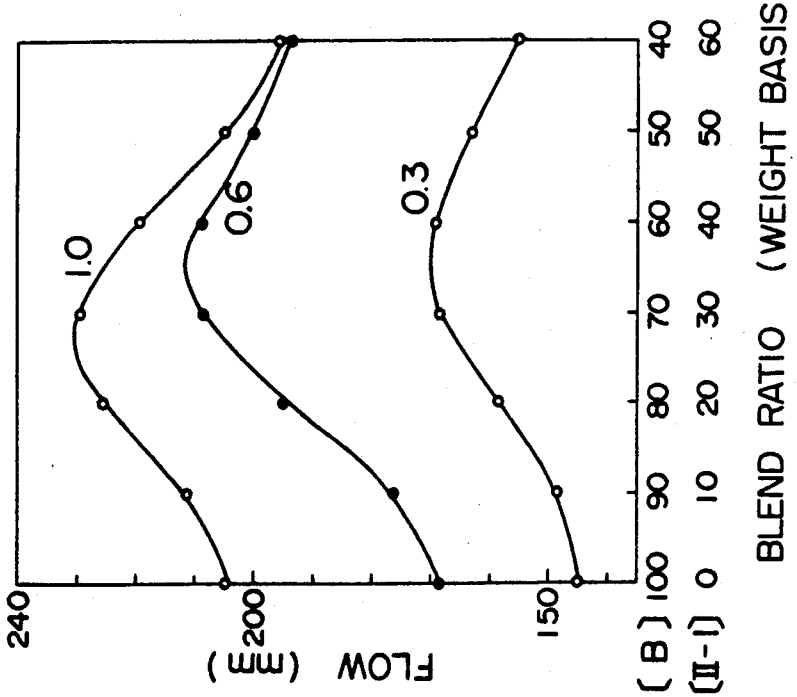
Figure 3:
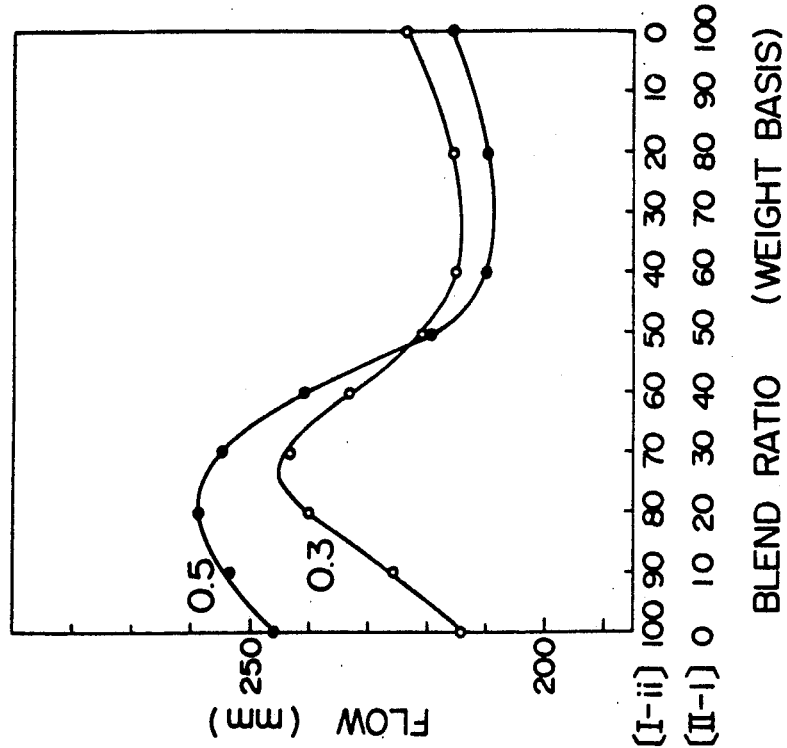

FIGS. 1–3 of the accompanying drawings are graphs showing the results of the flow test described in Example 1 (Table 2), while FIG. 4 is a graph showing the flow test of Example 3 (Table 4).

Preparation Experiment 1

While maintaining a mixture of 100 parts of betanaphthalenesulfonic acid and 20 parts of water at 85° C., 42 parts of 37% formalin was added dropwise thereto over a period of 3 hours. After completion of the addition of formalin, the mixture was reacted for a further 7 hours at 100° C. with stirring while adding dropwise 45 parts of water in the meantime. After converting the condensation reaction product to a Ca salt, it was reacted with NaOH to obtain an aqueous solution of a sodium salt of a naphthalenesulfonic acid-formaldehyde condensation product containing 8.5% of a mononucleus (hereinafter referred to as water-soluble salt

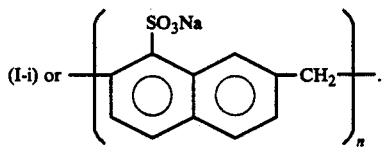

Preparation Experiment 2

One hundred parts of 98% concentrated sulfuric acid was added to 100 parts of JIS Standards No. 4 creosote oil, and the mixture was reacted for 3.5 hours at 100° C. This was followed by the addition of 20 parts of water and the dropwise addition of 25 parts of 37% formalin over a period of 2 hours at 60° C. with stirring. After completion of the dropping, the reaction was continued for a further 5 hours while adding dropwise 45 parts of water in the meantime. The resulting condensation product was then converted to a Ca salt and reacted with NaOH in customary manner to obtain an aqueous solution of a sodium salt of a creosote oil sulfonic acid-formaldehyde condensation product (hereinafter referred to as water-soluble salt (I-ii) or

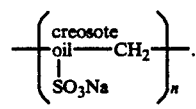

Preparation Experiment 3

126 grams of melamine, 40.5 grams of phenol and 400 grams of 37% formalin were mixed and reacted at 80° C. in a separable flask. After the reaction mixture became transparent, 90 grams of sodium sulfite, 74 grams of sodium hydrogensulfite and 200 milliliters of water were introduced at 60° C., after which the reaction mixture was again heated to 80° C. and reacted with stirring for 2 hours. This was followed by cooling the mixture to 50° C. and the addition of sulfuric acid to adjust the pH to 4.5, after which the reaction was carried out for a further 5 hours at 50° C. Next, sodium hydroxide was added to adjust the pH of the reaction mixture to 10.0, whereupon was obtained an aqueous solution of Na salt of sulfonated melamine-phenol-formaldehyde polycondensate (hereinafter referred to as water-soluble salt (I-1) or Na salt of M-P-F polycondensate).

Preparation Experiment 4

A mixture of 10 parts of maleic anhydride and 35 parts of benzene was added over a period of 3 hours with stirring to a mixture of 100 parts of the $C_5$ olefin mixture shown in Table 1, 0.4 part of azobisisobutyronitrile and 70 parts of benzene under an atmosphere of nitrogen in an autoclave. After completion of the addition, the reaction was continued for a further 4 hours by heating the mixture with stirring. After completion of the polymerization reaction, the precipitated copolymer was separated by filtration, collected and dried to obtain 164 parts of a 1:1 mol ratio $C_5$ olefin-maleic anhydride copolymer (MW = 4200). Four hundred parts of a 10% aqueous sodium hydroxide solution was then added to 84 parts of the so obtained copolymer and heated at 80°–90° C. with stirring to obtain an aqueous solution of a water-soluble $C_5$ olefin-sodium maleate copolymer (hereinafter referred to as water-soluble salt (II-1) or Na salt of ($C_5$-MA) copolymer.

Table 1

| | |
|---|---|
| n-Pentane | 41.1% |
| i-Pentane | 26.2% |
| 3-Methyl-butene-1 | 0.9% |
| Pentane-1 | 6.5% |
| 2-Methyl-butene-1 | 11.5% |
| Pentane-2 | 8.7% |
| 2-Methyl-butene-2 | 5.1% |

Preparation Experiment 5

A separable flask fitted with a reflux condenser was charged with 98 parts of maleic anhydride, 300 parts of methyl ethyl ketone, 84 parts of hexene-1 and 4 parts of azobisisobutyronitrile, and the mixture was reacted with stirring in an atmosphere of nitrogen at 65°–70° C. After carrying out the reaction for 10 hours, the system was cooled to room temperature and cold methanol was added to precipitate a polymer, which was separated, collected and dried under reduced pressure to obtain 108 parts of a hexene-1-maleic anhydride copolymer (mol ratio 1:1, MW = 3800). A mixture of 91 parts of the so obtained copolymer and 400 parts of a 10% aqueous sodium hydroxide solution was stirred at 80°–90° C. to obtain an aqueous solution of a water-soluble hexene-1-sodium maleate copolymer (hereinafter referred to as water-soluble salt (II-2) or Na salt of ($C_6$-MA) copolymer).

Preparation Experiment 6

The experiment was operated exactly as in Preparation Experiment 4, except that 56 parts of butene-1 was used as the olefin to obtain 132 parts of a butene-1-maleic anhydride copolymer (mol ratio 1:1, MW = 1900). A mixture of 77 parts of the so obtained copolymer and 400 parts of a 10% aqueous sodium hydroxide solution was reacted by heating the mixture with stirring to obtain an aqueous solution of a water-soluble butene-1-sodium maleate copolymer (hereinafter referred to as water-soluble salt (II-3) or Na salt of ($C_4$-MA) copolymer).

Preparation Experiment 7

An autoclave charged with 100 parts of maleic anhydride, 4 parts of azobisisobutyronitrile and 700 parts of benzene was introduced with ethylene until a pressure of 13 kg/cm$^2$ was obtained. The reaction was then carried out for 7 hours at 70° C. with stirring to obtain 108 parts of a white powdery ethylene-maleic anhydride copolymer. 63 parts of the so obtained copolymer and 400 parts of a 10% aqueous sodium hydroxide solution were then reacted at 80°–90° C. with stirring to obtain an aqueous solution of a water-soluble ethylene-sodium meleate copolymer (hereinafter referred to as water-soluble salt (II-4) or Na salt of ($C_2$-MA) copolymer).

Preparation Experiment 8

A mixture of 98 parts of maleic anhydride, 112 parts of octene-1, 4 parts of azobisisobutyronitrile and 400 parts of toluene was reacted in an autoclave under an atmosphere of nitrogen for 8 hours at 70°–75° C. with stirring. After completion of the reaction, the reaction system was cooled to room temperature and 500 parts of cold methanol was added to precipitate a polymer, which was separated by filtration, collected and dried to obtain 140 parts of an octene-1-maleic anhydride copolymer (mol ratio 1:1, MW = 4300). A mixture of 105 parts of the so obtained copolymer and 400 parts of a 10% aqueous sodium hydroxide solution was reacted with stirring to obtain an aqueous solution of a water-soluble octene-1-sodium maleate copolymer (hereinafter referred to as water-soluble salt (II-5) or Na salt of ($C_8$-MA) copolymer).

Example 1

A mortar flow test was conducted for determining the performance as a water-reducing admixture of the several water-soluble salts obtained in the foregoing preparation experiments. The results obtained are shown in Table 2 and FIGS. 1–3. In the figures the numerals (0.3 and 0.5) indicate the amounts (%) of the water-soluble salt added based on the cement.

The flow was measured by the flow test method of JIS Method R5201 (1964) by adding to a mixture of 400 grams of Asano ordinary portland cement and 400 grams of Toyoura standard sand 135 milliliters of water containing a mixture of components (I) and (II) in an amount of either 0.3% or 0.5% based on the cement.

As is apparent from Table 2 and FIGS. 1–3, the water-soluble salt mixture of components (I) and (II) of this invention demonstrates exceedingly great synergistic effects at the blend ratios in the ranges of 95–50%-:5–50%. Again, it can be seen that the water-soluble salts (II-2) and (II-3) demonstrate synergistic effects when used in conjunction with the aromatic hydrocarbon sulfonic acid type water-reducing admixture, but that the water-soluble salts (II-4) and (II-5) do not demonstrate such effects.

Table 2

| Admixture Components [I] | Admixture Components [II] | Admixture to cement (%) | Blend Ratio [I]/[II] (Weight Basis) Flow (mm) | | | | | | | | |
|---|---|---|---|---|---|---|---|---|---|---|---|
| | | | 100/0 | 90/10 | 80/20 | 70/30 | 60/40 | 50/50 | 40/60 | 20/80 | 0/100 |
| A* | [II-1] i.e. Na salt of ($C_5$-MA) copolymer | 0.3 | 220 | 231 | 240 | 248 | 248 | 240 | 232 | 225 | 224 |
| | | 0.5 | 254 | 271 | 284 | 283 | 271 | 248 | 233 | 218 | 216 |
| [I-i] i.e. [structure: naphthalene with SO$_3$Na and CH$_2$, n] | [II-1] i.e. Na salt of ($C_5$-MA) copolymer | 0.3 | 208 | 217 | 233 | 244 | 232 | 217 | 214 | 217 | 224 |
| | | 0.5 | 236 | 248 | 257 | 254 | 235 | 214 | 210 | 211 | 216 |
| [I-ii] i.e. [structure: creosote oil—CH$_2$ with SO$_3$Na, n] | [II-1] i.e. Na salt of ($C_5$-MA) copolymer | 0.3 | 214 | 226 | 240 | 243 | 233 | 221 | 215 | 216 | 224 |
| | | 0.5 | 247 | 253 | 259 | 255 | 241 | 219 | 210 | 210 | 216 |
| A* | [II-2] i.e. Na salt of ($C_6$-MA) copolymer | 0.3 | 220 | — | 235 | 239 | — | — | — | — | — |
| | | 0.5 | 254 | — | 267 | 264 | — | — | — | — | — |
| A* | [II-3] i.e Na salt of ($C_4$-MA) copolymer | 0.3 | 220 | — | 238 | 233 | — | — | — | — | — |
| | | 0.5 | 254 | — | 258 | 258 | — | — | — | — | — |
| A* | [II-4] i.e. Na salt of ($C_2$-MA) copolymer | 0.3 | 220 | — | 189 | 163 | — | — | — | — | — |
| | | 0.5 | 254 | — | — | — | — | — | — | — | — |
| A* | [II-5] i.e. Na salt of ($C_8$-MA) copolymer | 0.3 | 220 | — | 185 | 167 | — | — | — | — | — |
| | | 0.5 | 254 | — | — | — | — | — | — | — | — |

*Commercial Na salt of naphthalenesulfonic acid-formaldehyde condensation product (MIGHTY 150, a product of Kao Soap Co., Ltd., Japan).

Example 2

The results of a mortar test conducted on various admixtures are shown in Table 3. The test was carried out in accordance with the JIS Method R5201 (1964).

The cement used was Asano ordinary portland cement, and the sand was Toyoura standard sand. The experiment was conducted in such a manner that the flow in each instance would become a uniform value of about 210 m/m.

It can be seen from Table 3 that the invention water-reducing admixture exhibits superior water-reducing effects as well as strength enhancing effects.

results obtained are shown in Table 4 and FIG. 4. The numerals in FIG. 4 (0.3, 0.6 and 1.0) indicate the amounts (%) of the water-soluble salt added based on the cement.

The flow was measured by the flow test method of JIS Method R5201 (1964) by adding to a mixture of 500 grams of Onoda ordinary portland cement and 500 grams of Toyoura standard sand 160 milliliters of water Table 3

| Admixture Components | | Blend ratio | Admixture to cement | Sand | Water | Water reduction | Water cement ratio | Flow | Air | Compressive strength (kg/cm$^2$) | | Compr. strength increase (%) | |
|---|---|---|---|---|---|---|---|---|---|---|---|---|---|
| [I] | [II] | [I]/[II] | (%) | (gr.) | (gr.) | (gr.) | (%) | (%) | (mm) | (%) | 3 days | 7 days | 3 days | 7 days |
| — | — | 0/0 | 0 | 1000 | 1000 | 370 | 0 | 37.0 | 210 | 1.5 | 378 | 471 | 0 | 0 |
| A* | — | 100/0 | 0.2 | 1000 | 1000 | 340 | 8.1 | 34.0 | 212 | 1.1 | 424 | 508 | 12.2 | 7.9 |
| | | | 0.3 | 1000 | 1000 | 330 | 10.4 | 33.0 | 210 | 1.3 | 441 | 526 | 16.6 | 11.7 |
| [I-ii] i.e. $\left[\begin{array}{c}\text{creosote}\\ \text{oil}-\text{CH}_2\\ |\\ \text{SO}_3\text{Na}\end{array}\right]_n$ [II-1] | — | 100/0 | 0.2 | 1000 | 1000 | 346 | 6.5 | 34.6 | 212 | 1.8 | 410 | 489 | 8.5 | 3.8 |
| | | | 0.3 | 1000 | 1000 | 338 | 8.7 | 33.8 | 210 | 1.9 | 422 | 506 | 11.6 | 7.4 |
| A* | i.e. Na salt of (C$_5$—MA) copolymer [II-3] | 70/30 | 0.2 | 1000 | 100 | 327 | 10.8 | 32.7 | 210 | 1.1 | 456 | 541 | 20.1 | 14.9 |
| | | | 0.3 | 1000 | 1000 | 308 | 16.8 | 30.8 | 212 | 1.2 | 476 | 559 | 25.4 | 18.7 |
| A* | i.e. Na salt of (C$_4$—MA) copolymer [II-1] | 70/30 | 0.2 | 1000 | 1000 | 332 | 10.1 | 33.2 | 208 | 1.2 | 435 | 519 | 15.1 | 10.1 |
| | | | 0.3 | 1000 | 1000 | 320 | 13.5 | 32.0 | 212 | 1.1 | 450 | 537 | 19.0 | 14.0 |
| [I-ii] i.e. $\left[\begin{array}{c}\text{creosote}\\ \text{oil}-\text{CH}_2\\ |\\ \text{SO}_3\text{Na}\end{array}\right]_n$ | i.e. Na salt of (C$_5$—MA) copolymer | 70/30 | 0.2 | 1000 | 1000 | 333 | 10.0 | 33.0 | 208 | 1.5 | 432 | 514 | 13.1 | 9.1 |
| | | | 0.3 | 1000 | 1000 | 318 | 14.0 | 31.8 | 209 | 1.7 | 450 | 533 | 19.0 | 13.2 |

*The same as in Table 2.

Example 3

The mortar flow test was conducted on various admixtures for determining the performance as a water-reducing admixture of cement of these admixtures. The containing either 0.3%, 0.6% or 1.0% of the several admixtures based on the weight of the cement.

As is apparent from these results, the invention admixture demonstrates marked synergistic effects at blend ratios in the range of 95–50:5–50.

Table 4

| Admixture Components | | Admixture to cement % | Flow (mm) Blend ratio[I]/[II] (weight basis) | | | | | | |
|---|---|---|---|---|---|---|---|---|---|
| [I] | [II] | | 100 | 90 | 80 | 70 | 60 | 50 | 40 |
| | | | 0 | 10 | 20 | 30 | 40 | 50 | 60 |
| B* | [II-1] i.e. Na salt of (C$_5$-MA) copolymer | 0.3 | 145 | 148 | 158 | 168 | 169 | 163 | 160 |
| | | 0.6 | 168 | 177 | 195 | 208 | 208 | 200 | 193 |
| | | 1.0 | 205 | 212 | 226 | 229 | 219 | 205 | 196 |
| [I-1] i.e. Na salt of M-P-F polycondensate | [II-1] i.e. Na salt of (C$_5$-MA) copolymer | 0.3 | 148 | 153 | 163 | 170 | 169 | 162 | 161 |
| | | 0.6 | 176 | 189 | 205 | 213 | 209 | 199 | 194 |
| | | 1.0 | 212 | 225 | 236 | 238 | 225 | 208 | 197 |
| B* | [II-2] i.e. Na salt of (C$_6$-MA) copolymer | 0.3 | 145 | — | 155 | 164 | — | — | — |
| | | 0.6 | 168 | — | 191 | 201 | — | — | — |
| B* | [II-3] i.e. Na salt of (C$_4$-MA) copolymer | 0.3 | 145 | — | 155 | 163 | — | — | — |
| | | 0.6 | 168 | — | 189 | 198 | — | — | — |
| B* | [II-4] i.e. Na salt of (C$_2$-MA) copolymer | 0.3 | 145 | — | 139 | 133 | — | — | — |
| | | 0.6 | 168 | — | 160 | 154 | — | — | — |
| B* | [II-5] i.e. Na salt of | 0.3 | 145 | — | 134 | 128 | — | — | — |

Table 4-continued

| Admixture Components | | Admixture to cement % | Flow (mm) Blend ratio[I]/[II] (weight basis) | | | | | | |
| --- | --- | --- | --- | --- | --- | --- | --- | --- | --- |
| [I] | [II] | | 100 / 0 | 90 / 10 | 80 / 20 | 70 / 30 | 60 / 40 | 50 / 50 | 40 / 60 |
| | ($C_8$-MA) copolymer | 0.6 | 168 | — | 154 | 148 | — | — | — |

*Na salt of sulfonated melamine-formaldehyde polycondensate (MELWENT F-10, a product of Showa Denko K. K., Japan)

Example 4

The results obtained on carrying out the mortar test on various admixtures are shown in Table 5. The test was conducted in accordance with the JIS Method R5201 (1964). The cement and sand used were Asano ordinary portland cement and Toyoura standard sand, respectively. The experiment was so conducted that the flow would become a uniform 210 m/m in each instance.

As can be seen from the results of Table 5, superior water-reducing effects as well as strength enhancing effects are demonstrated in the case of the invention water-reducing admixture even though a smaller amount is added.

Table 5

| Admixture Components | | Blend Ratio | Admixture to cement | Cement | Sand | Water | Water reduction | Water cement ratio | Flow | Air | Compressive strength, 7 days | |
| --- | --- | --- | --- | --- | --- | --- | --- | --- | --- | --- | --- | --- |
| [I] | [II] | [I]/[II] | (%) | (gr.) | (gr.) | (gr.) | (%) | (%) | (mm) | (%) | kg/cm$^2$ | increase (%) |
| — | — | 0/0 | 0 | 1000 | 1000 | 400 | 0 | 40.0 | 210 | 2.1 | 489 | 0 |
| | | | 0.5 | 1000 | 1000 | 374 | 6.5 | 37.4 | 211 | 2.7 | 521 | 6.6 |
| B* | — | 100/0 | 1.0 | 1000 | 1000 | 344 | 14.0 | 34.4 | 208 | 2.9 | 560 | 14.5 |
| | | | 1.5 | 1000 | 1000 | 334 | 16.5 | 33.4 | 208 | 3.0 | 579 | 18.4 |
| B* | [II-1] i.e. Na salt of ($C_5$-MA) copolymer | 70/30 | 0.25 | 1000 | 1000 | 370 | 7.5 | 37.0 | 209 | 2.6 | 528 | 8.0 |
| | | | 0.50 | 1000 | 1000 | 340 | 15.0 | 34.0 | 212 | 3.0 | 569 | 16.4 |
| B* | [II-1] i.e. Na salt of ($C_5$-MA) copolymer | 80/20 | 0.75 | 1000 | 1000 | 330 | 17.5 | 33.0 | 210 | 3.1 | 580 | 18.6 |

*The same as in Table 4.

I claim:

1. A water-reducing admixture for use in preparing a hydraulic composition comprising
   I. 95 to 50% by weight of a water-soluble sulfonate and
   II. 5 to 50% by weight of a water-soluble copolymer, said water-soluble sulfonate (I) being selected from the group consisting of
   a. a water-soluble salt of a sulfonated aromatic hydrocarbon represented by the following structure

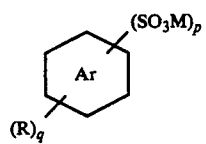

wherein

is an aromatic ring selected from the group consisting of the benzene ring and a condensed ring having 2–12 rings, M is selected from the group consisting of an alkali metal atom, an alkaline earth metal atom, ammonium ion and a lower amine, R is selected from the group consisting of hydrogen atom, —NH$_2$, —OH, —COOH and an alkyl group having 1–2 carbon atoms, p is an integer from 1 to 2, q is an integer from 1 to 2, b. a water-soluble sulfonate having a structural unit represented by the following formula

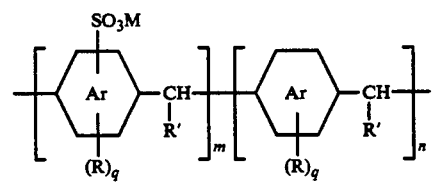

wherein

is an aromatic ring selected from the group consisting of the benzene ring and a condensed ring having 2–12 rings, M is selected from the group consisting of an alkali metal atom, an alkaline earth metal atom, ammonium ion and a lower amine, R is selected from the group consisting of hydrogen atom, —NH$_2$, —OH, —COOH and an alkyl group having 1–2 carbon atoms, R' is selected from the group consisting of hydrogen atom and an alkyl group having 1–4 carbon atoms, q is an integer from 1 to 2, $m$ and $n$ are each an integer, and $m$ plus $n$ provides a molecular weight of 1,500–10,000; and c. a water-soluble salt of sulfonated melamine resin selected from the group consisting of
1 melamine-formaldehyde polycondensates, and
2 melamine-phenol-formaldehyde polycondensates, said water-soluble copolymer (II) being a water-soluble olefin-ethylenically unsaturated dicarboxylic acid salt copolymer having a structural unit represented by the following formula

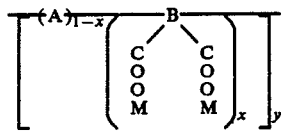

wherein
A is an olefin unit having 4–6 carbon atoms,
B is selected from the group consisting of

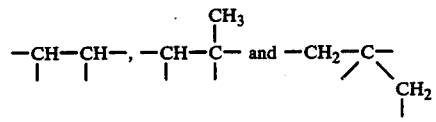

M is selected from the group consisting of an alkali metal atom, an alkaline earth metal atom, ammonium group and a lower amine,
$x$ is from 0.4 to 0.6, and
$y$ is an integer from 2 to 300.

2. A water-reducing admixture of claim 1 wherein the water-soluble sulfonate (I) is said water-soluble sulfonate (I)-(b) which is a water-soluble salt of a condensatior product of a sulfonated aromatic hydrocarbon with an aliphatic aldehyde.

3. A water-reducing admixture of claim 1 wherein the water-soluble sulfonte (I) is a sodium sulfonate of a condensation product of naphthalene with formaldehyde.

4. A water-reducing admixture of claim 2 wherein the water-soluble salt is a sodium sulfonate of a condensation product of creosote oil with formaldehyde.

5. A water-reducing admixture of claim 1 wherein the water-soluble copolymer (II) is a derivative of an olefinethylenically unsaturated dicarboxylic acid salt copolymer.

6. A water-reducing admixture of claim 1 wherein A of (II) is an acyclic olefin having 4–6 carbon atoms.

7. A water-reducing admixture of claim 1 wherein B of (II) is

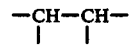

8. A water-reducing admixture of claim 5 wherein the water-soluble copolymer (II) is a $C_5$-acyclic olefin-maleic acid salt copolymer.

9. A water-reducing admixture of claim 5 wherein the water-soluble copolymer (II) is a $C_6$-acyclic olefin-maleic acid salt copolymer.

10. A water-reducing admixture according to claim 1 wherein the weight ratio of water-soluble sulfonate (I) to water-soluble copolymer (II) is 90–60:10–40.

11. A hydraulic composition comprising hydraulic substance and from 0.01–2.0% by weight, based on the hydraulic substance, of the water-reducing admixture defined in claim 1.

* * * * *